United States Patent
Valpatic et al.

(10) Patent No.: US 11,667,442 B2
(45) Date of Patent: Jun. 6, 2023

(54) INTEGRATED LIFTING AND PIVOTING DEVICE

(71) Applicant: SULLAIR, LLC, Michigan City, IN (US)

(72) Inventors: Michael Valpatic, Michigan City, IN (US); Michael Groszek, Michigan City, IN (US)

(73) Assignee: SULLAIR, LLC, Michigan City, IN (US)

(*) Notice: Subject to any disclaimer, the term of this patent is extended or adjusted under 35 U.S.C. 154(b) by 0 days.

(21) Appl. No.: 17/628,831

(22) PCT Filed: Jul. 23, 2019

(86) PCT No.: PCT/US2019/043038
§ 371 (c)(1),
(2) Date: Jan. 20, 2022

(87) PCT Pub. No.: WO2021/015742
PCT Pub. Date: Jan. 28, 2021

(65) Prior Publication Data
US 2022/0315294 A1    Oct. 6, 2022

(51) Int. Cl.
*B65D 43/26* (2006.01)
*B65D 43/18* (2006.01)

(52) U.S. Cl.
CPC ............ *B65D 43/26* (2013.01); *B65D 43/18* (2013.01)

(58) Field of Classification Search
CPC ........ B65D 43/26; B65D 43/18; B65D 43/16; E05B 65/006; E05B 17/2046
USPC ....... 220/285, 284, 260, 241, 834, 833, 811, 220/810; 292/138, 137
See application file for complete search history.

(56) References Cited

U.S. PATENT DOCUMENTS

| | | | |
|---|---|---|---|
| 203,817 A * | 5/1878 | Brock | B65F 1/1623 220/88.1 |
| 1,268,904 A * | 6/1918 | White | 220/256.1 |
| 1,494,745 A | 5/1924 | Griffin et al. | |
| 3,773,428 A | 11/1973 | Bowman | |
| 3,858,998 A | 1/1975 | Larsson et al. | |
| 5,531,541 A | 7/1996 | Clover et al. | |

(Continued)

FOREIGN PATENT DOCUMENTS

| | | | |
|---|---|---|---|
| BE | 1005451 A3 | 7/1993 | |
| CN | 1046488853 A * | 5/2015 | B65D 90/10 |

(Continued)

OTHER PUBLICATIONS

Translation of DE2228307. Svensson et al., Jan. 4, 1973, pp. 2-3. (Year: 1973).*

(Continued)

*Primary Examiner* — Robert J Hicks
(74) *Attorney, Agent, or Firm* — Procopio, Cory, Hargreaves & Savitch LLP

(57) ABSTRACT

A tank having a sealing plate and a tank body and lifting mechanism for separating the sealing plate from the tank body of a tank are provided. The lifting mechanism includes a pin inserted into a flange of the tank body extending through the sealing plate, and a threaded device coupled to the sealing plate and selectively contacting the pin to apply a pushing force in response to the threaded device being inserted into the sealing plate.

12 Claims, 16 Drawing Sheets

(56) References Cited

U.S. PATENT DOCUMENTS

| | | | |
|---|---|---|---|
| 5,732,512 A | 3/1998 | Ueno et al. | |
| 7,695,213 B1 | 4/2010 | Akkala et al. | |
| 8,522,996 B2* | 9/2013 | Beese | C12M 23/32 |
| | | | 220/4.24 |
| 2006/0027589 A1* | 2/2006 | Metzdorf | B65D 43/167 |
| | | | 220/817 |
| 2008/0138153 A1 | 6/2008 | Johnson et al. | |
| 2009/0071958 A1* | 3/2009 | Pellegrino | B65D 43/26 |
| | | | 220/260 |
| 2011/0000395 A1 | 1/2011 | Hunter | |

FOREIGN PATENT DOCUMENTS

| | | |
|---|---|---|
| CN | 108479320 A | 9/2018 |
| DE | 2228307 C2 | 6/1982 |
| FR | 3059310 A1 | 6/2018 |
| JP | S5429408 U | 2/1979 |
| WO | 9920923 A1 | 4/1999 |

OTHER PUBLICATIONS

Translation of JPS5429408. Feb. 26, 1979, p. 3. (Year: 1979).*
Patent Cooperation Treaty, International Search Report, Application No. PCT/US2019/043038, dated Nov. 1, 2019, in 2 pages.
Patent Cooperation Treaty, International Preliminary Report on Patentability, Application No. PCT/US2019/043038, dated Jan. 25, 2022, in 6 pages.
European Patent Office. Extended European Search Report dated Feb. 28, 2023. European Application No. 19938977.6-1015/ 4003864 PCT/US2019004038. Applicant Name: Sullair, LLC. English Language. 8 pages.

* cited by examiner

INTEGRATED LIFTING AND PIVOTING DEVICE

BACKGROUND

Field

The present disclosure relates generally to separator tanks, and in particular to a separator tank having a lifting mechanism for removing a sealing plate that seals the separator tank.

Related Art

Separation tanks are often used with compressor installations in order to allow lubricating fluids to be removed from compressor fluids. For example, separation tanks may be used to separate lubricating oils from the air stream in air compressor installations. Such separator tanks are often designed to withstand high compressor fluid pressures and are often constructed with thick side-walls in order to withstand the necessary pressures. The separation of the lubricating fluid from the compressor fluids is often achieved by a removable coalescing separator element, which may require regular replacement. Thus, removal of tank sealing plates to access the interior of the tank may be required on a regular basis.

In order to assist with removal of the tank sealing plate related art separator tanks may include a lifting device attached to the outer sidewall of the tank and protruding outward in order to provide leverage to lift the sealing plate off the tank and allow it to rotate or pivot out of the way so that the interior of the tank can be accessed. For example, an external support frame with a hydraulic jacking bolt may be welded to the outside of the tank sidewall. In order to remove the sealing plate, the jacking bolt may be articulated to lift the sealing plate off of the tank so that it may be pivoted out of the way to access the interior of the tank.

With a lifting mechanism attached to the side of the tank in this manner, the footprint of the tank is increased, requiring more free space around tank installations. Thus, related art tanks with the external lifting structure must be provided with additional space required only for the lifting mechanism resulting in a waste of space purely to allow the tank to be opened. If the external lifting structure was not necessary, this spacing requirement of a similar sized tank would be removed, or a larger tank could be placed within the same space.

SUMMARY

Aspects of the present application may include a lifting mechanism for separating a sealing plate from a tank body of a tank. The lifting mechanism may include a pin inserted into a flange of the tank body extending through the sealing plate, and a threaded device coupled to the sealing plate and selectively contacting the pin to apply a pushing force in response to the threaded device being inserted into the sealing plate.

Additional aspects of the present application may include a lifting mechanism further comprising a base flange extending upward from the sealing plate, wherein the threaded device engages the base flange, wherein the pin extends entirely through the sealing plate and at least partially into the base flange.

Further aspects of the present application may include a lifting mechanism further comprising the base flange includes a threaded surface that engages the threaded device to translate rotation of the threaded device into vertical movement of the threaded device, and wherein the vertical movement of the threaded device selectively increases and decreases insertion of the threaded device into the base flange.

Additional aspects of the present application may also include a lifting mechanism further including the threaded device having a tool head configured to engage a tool to facilitate rotation of the threaded device.

Further aspects of the present application may also include a lifting mechanism having a pin with a length shorter than a height of the base flange and which does not contact the base flange when inserted into the base flange.

Additional aspects of the present application may also include a lifting mechanism having a pin is positioned at a diameter from a centerline of the tank body that is less than an outer diameter from the centerline of a tank body.

Further aspects of the present application may further include a lifting mechanism with a pin having a cylindrical shape and providing a pivot point for the sealing plate to rotate relative to the pin.

Additional aspects of the present application may also include a tank having a tank body having a bolt flange, a sealing plate coupled to the tank body to selectively seal the tank body adjacent the bolt flange, a pin inserted into the bolt flange of the tank body and extending through the sealing plate, and a threaded device coupled to the sealing plate and selectively contacting the pin to apply a pushing force in response to the threaded device being inserted into the sealing plate.

Further aspects of the present application may include a tank having a sealing plate that includes a base flange extending upward from the sealing plate, wherein the threaded device engages the base flange, and wherein the pin extends entirely through the sealing plate and at least partially into the base flange.

Additional aspects of the present application may also include a tank having a base flange that includes a threaded surface that engages the threaded device to translate rotation of the threaded device into vertical movement of the threaded device and wherein the vertical movement of the threaded device selectively increases and decreases insertion of the threaded device into the base flange.

Further aspects of the present application may include a tank having a threaded device that includes a tool head configured to engage a tool to facilitate rotation of the threaded device.

Additional aspects of the present application may also include a tank having a pin that has a length shorter than a height of the base flange and that does not contact the base flange when inserted into the base flange.

Further aspects of the present application may also include a pin positioned at a diameter from a centerline of the tank body that is less than an outer diameter from the centerline of the tank body.

Additional aspects of the present application may include a tank having a pin that has a cylindrical shape and provides a pivot point for the sealing plate to rotate relative to the pin.

Further aspects of the present application may include a lifting mechanism for separating a sealing plate from a tank body of a tank. The lifting mechanism may include a pin inserted into a flange of the tank body extending through the sealing plate, and threaded means for selectively contacting the pin to apply a pushing force in response to the threaded means being inserted into the sealing plate.

BRIEF DESCRIPTION OF THE DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

DETAILED DESCRIPTION

Figure 1:
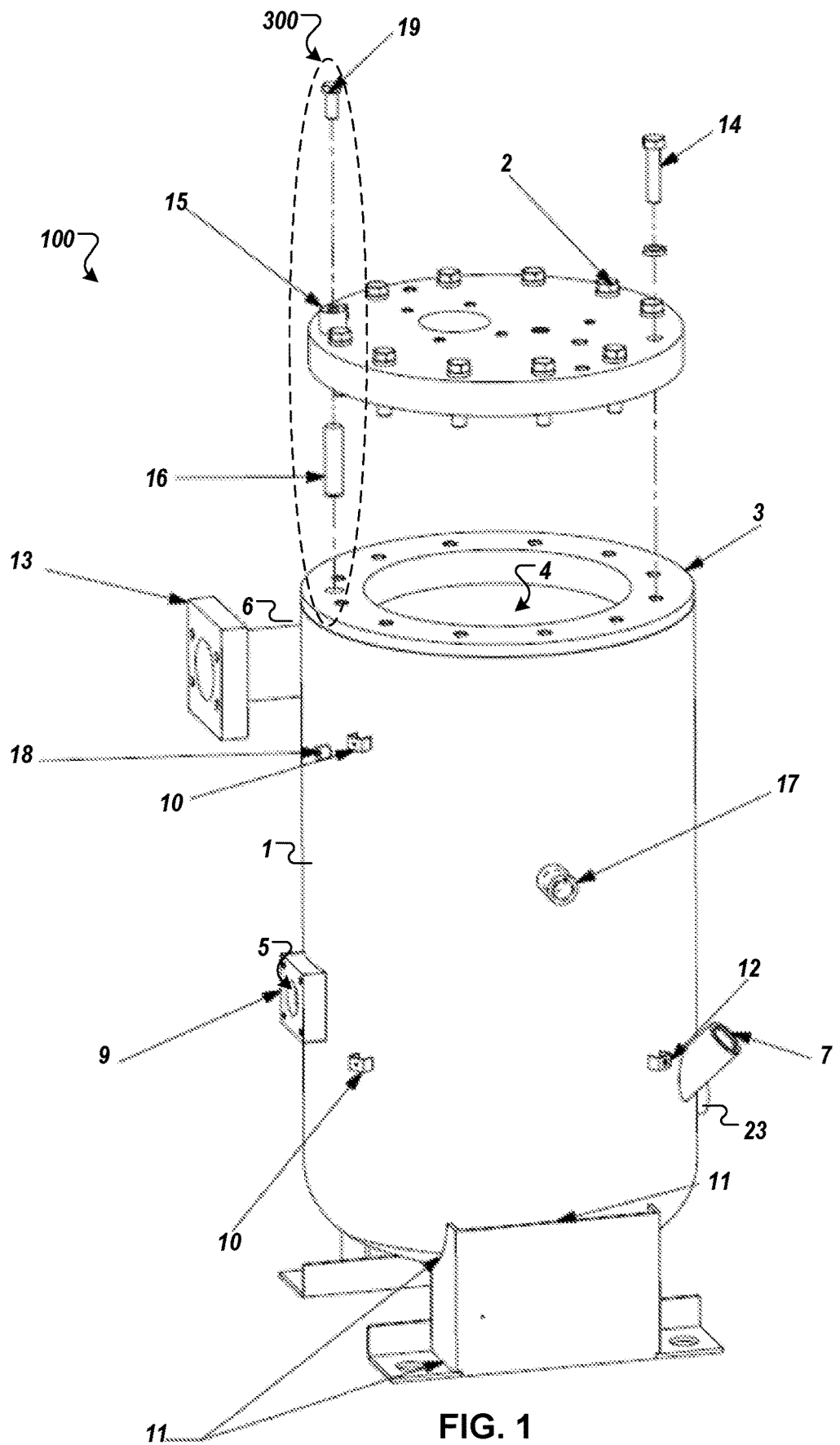
FIG. 1 is an exploded, perspective view generally illustrating a separator tank in accordance with an example implementation of the present application.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application. Further, sequential terminology, such as "first", "second", "third", etc., may be used in the description and claims simply for labeling purposes and should not be limited to referring to described actions or items occurring in the described sequence. Actions or items may be ordered into a different sequence or may be performed in parallel or dynamically, without departing from the scope of the present application.

Figure 2:
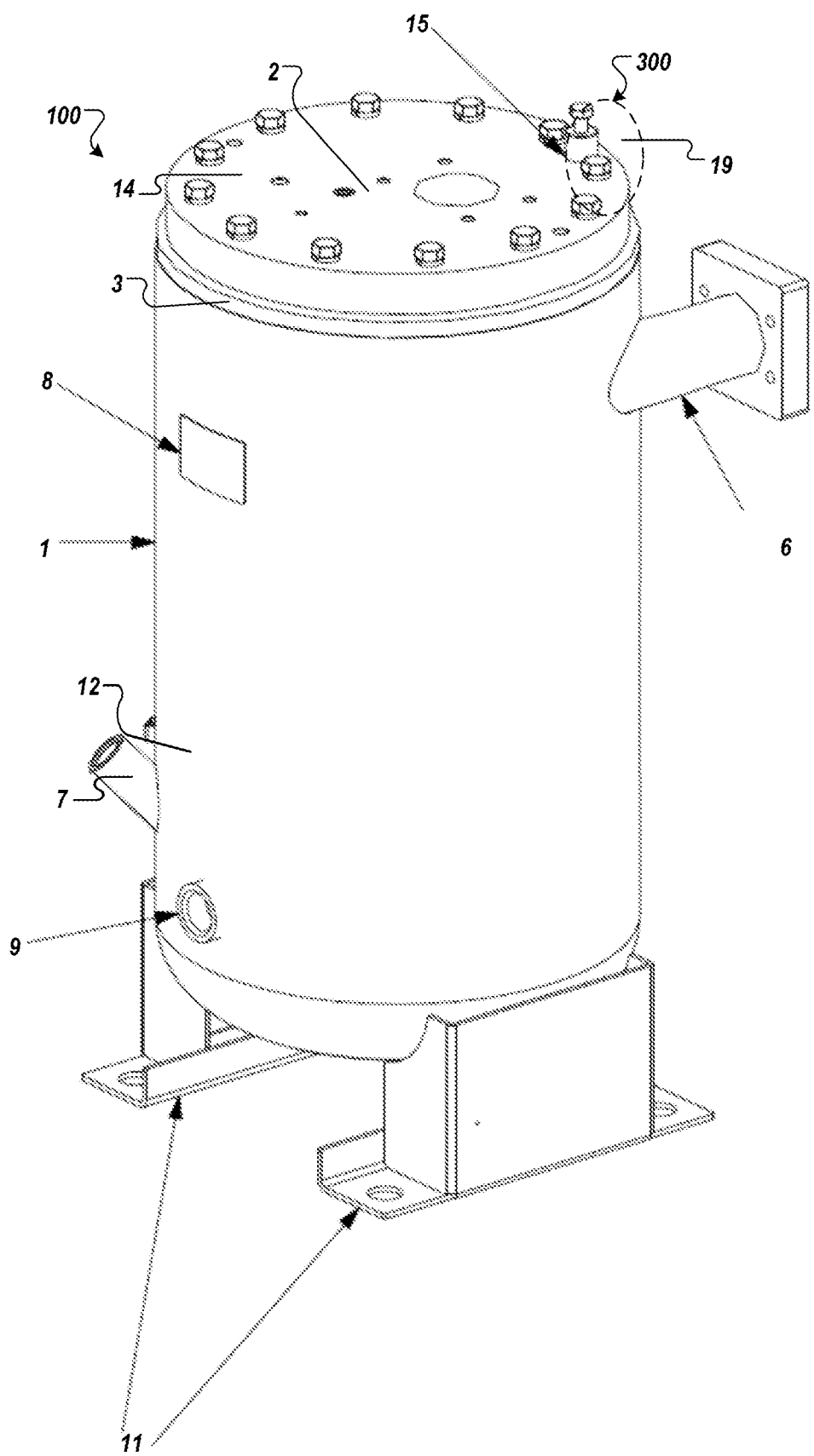
FIG. 2 is a perspective view illustrating a first example implementation of the separator tank in accordance with the example implementation of FIG. 1.
Figure 3:
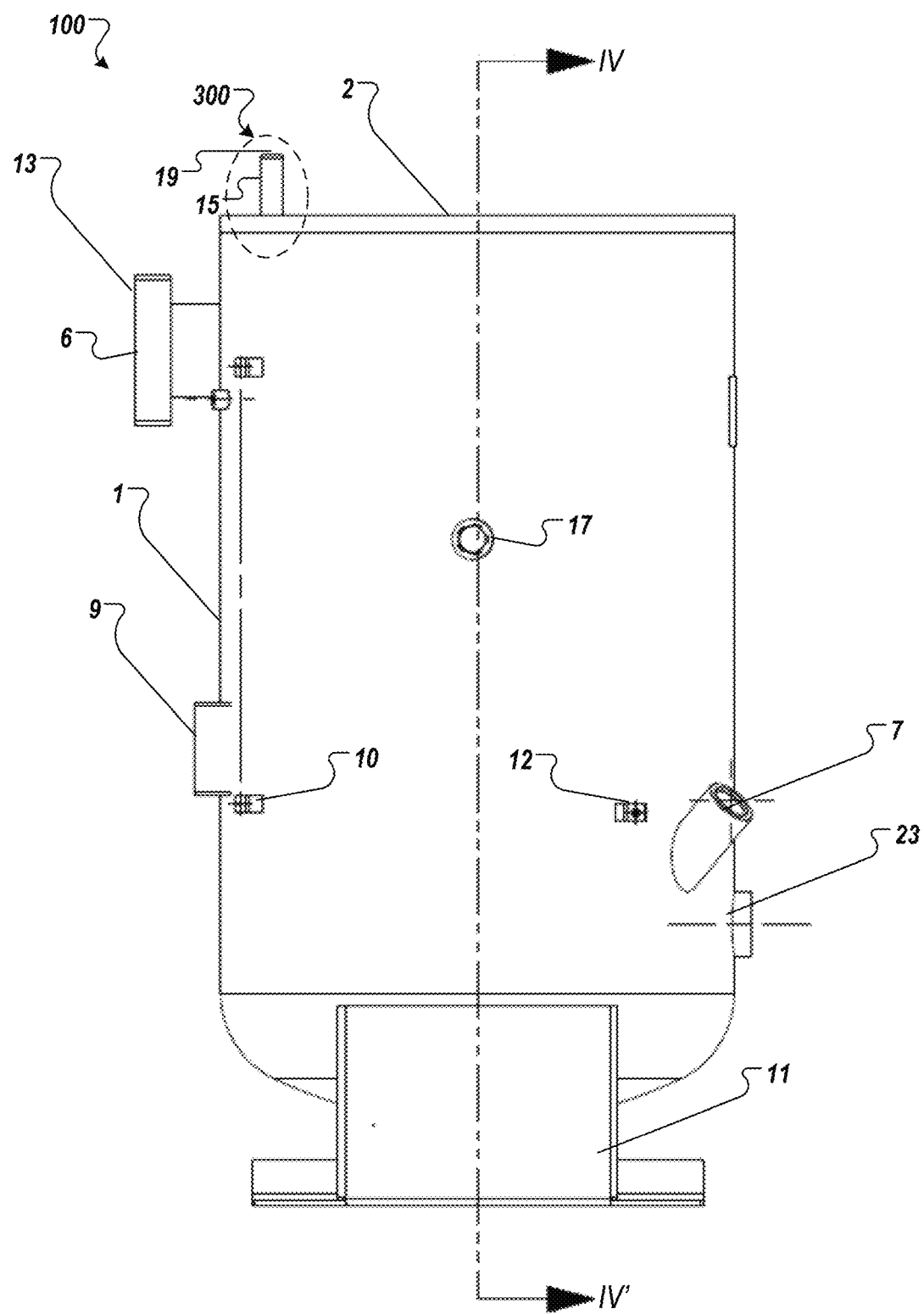
FIG. 3 is a side view illustrating the separator tank in accordance with the example implementation of FIG. 1.
Figure 4:
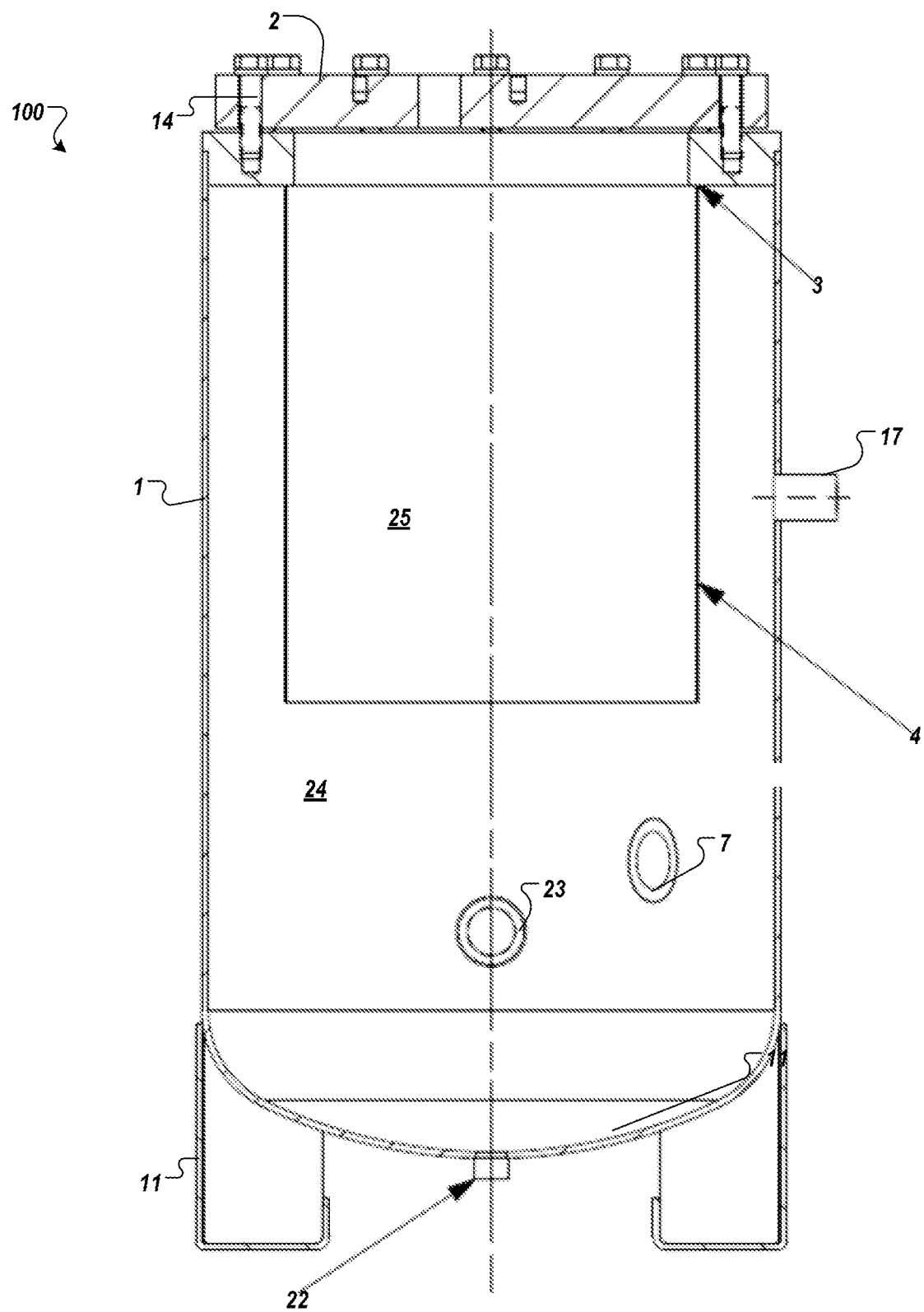
FIG. 4 is a sectional view of the separator tank taken along plane IV-IV' of FIG. 3.
Figure 5:
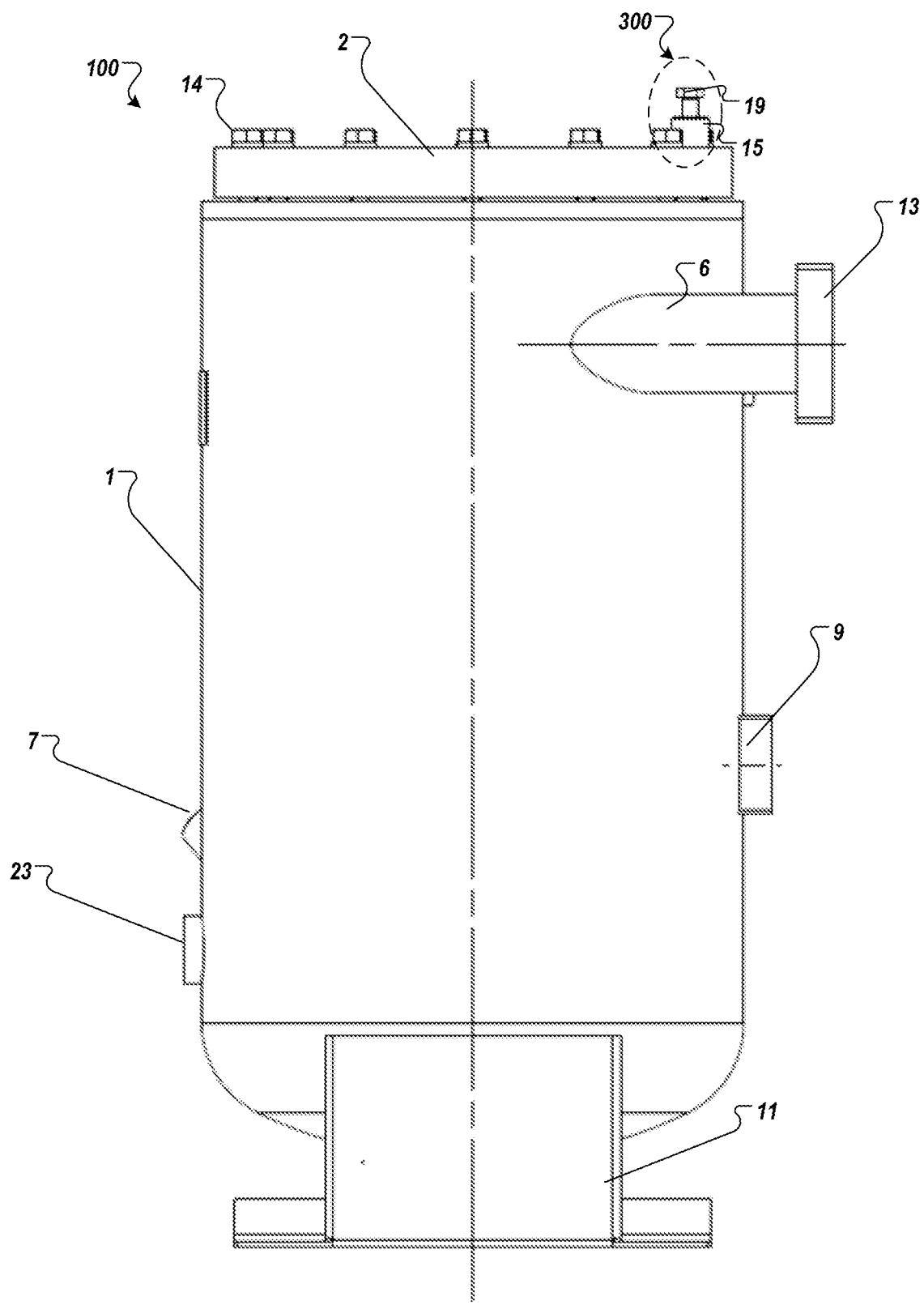
FIG. 5 is another side view illustrating the separator tank in accordance with the example implementation of FIG. 1.
Figure 6:
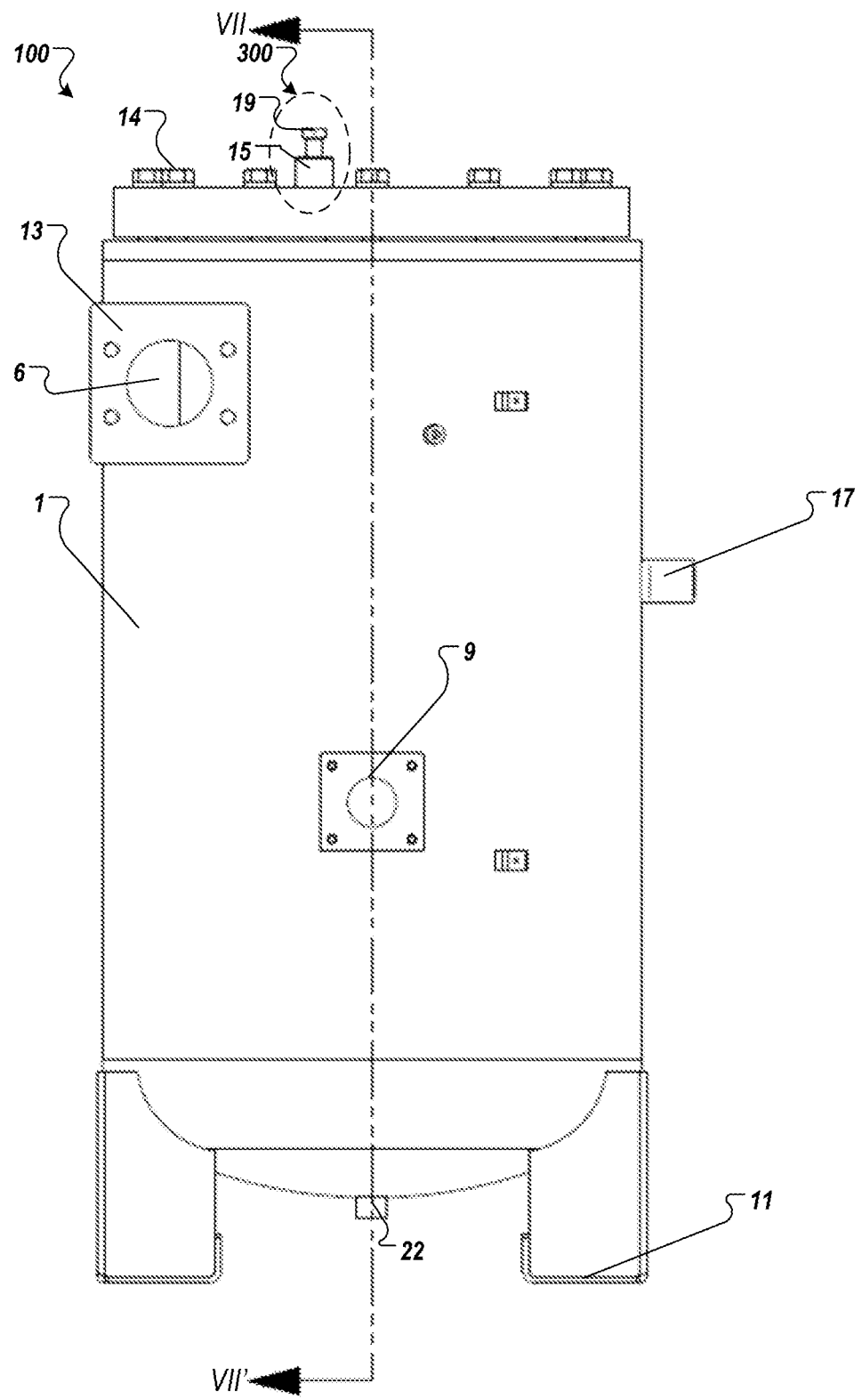
FIG. 6 is a rear view illustrating the separator tank in accordance with the example implementation of FIG. 1.
Figure 7:
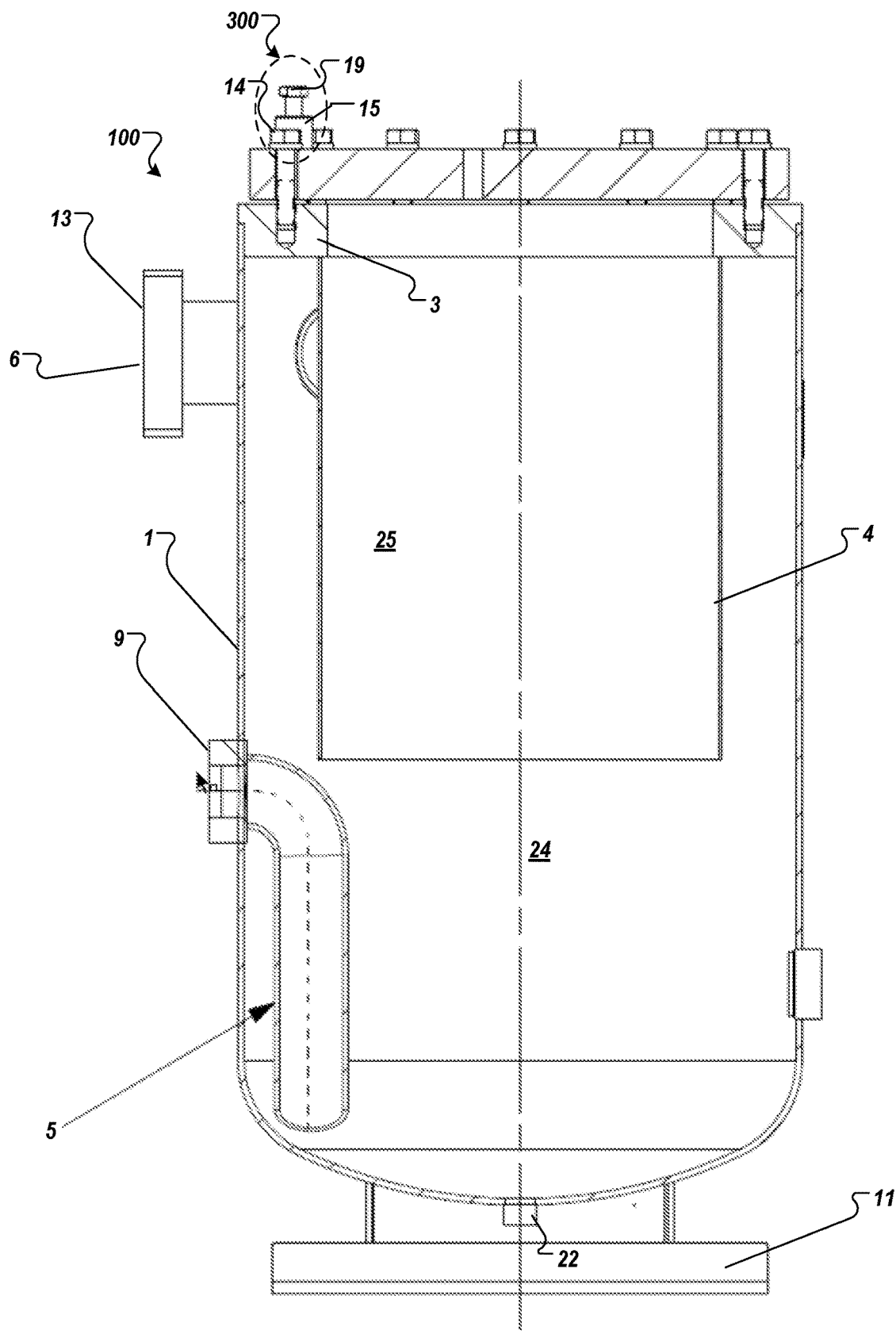
FIG. 7 is a sectional view of the separator tank taken along plane VII-VII' of FIG. 6.
Figure 8:
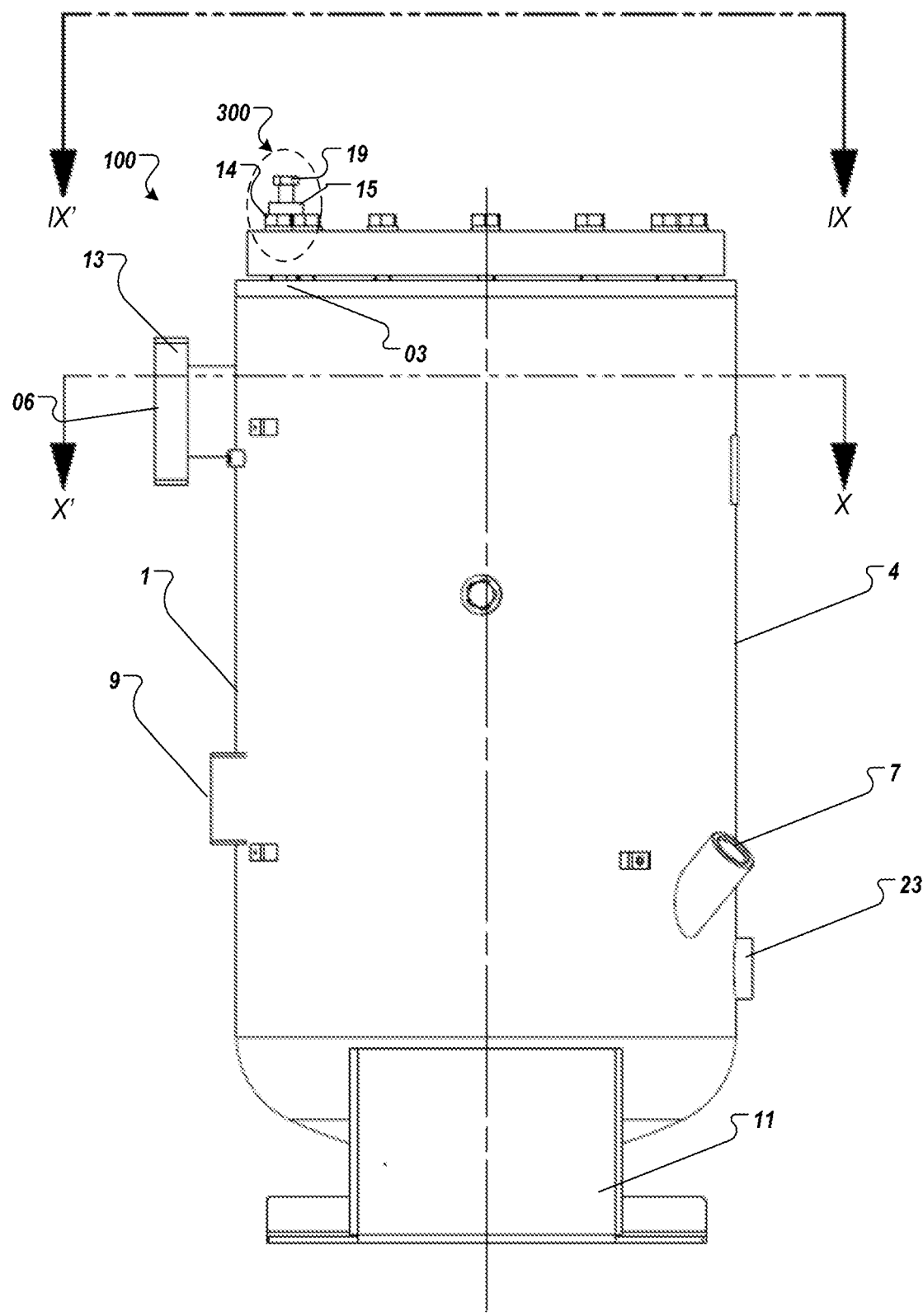
FIG. 8 is a front view illustrating the separator tank in accordance with the example implementation of FIG. 1.
Figure 9:
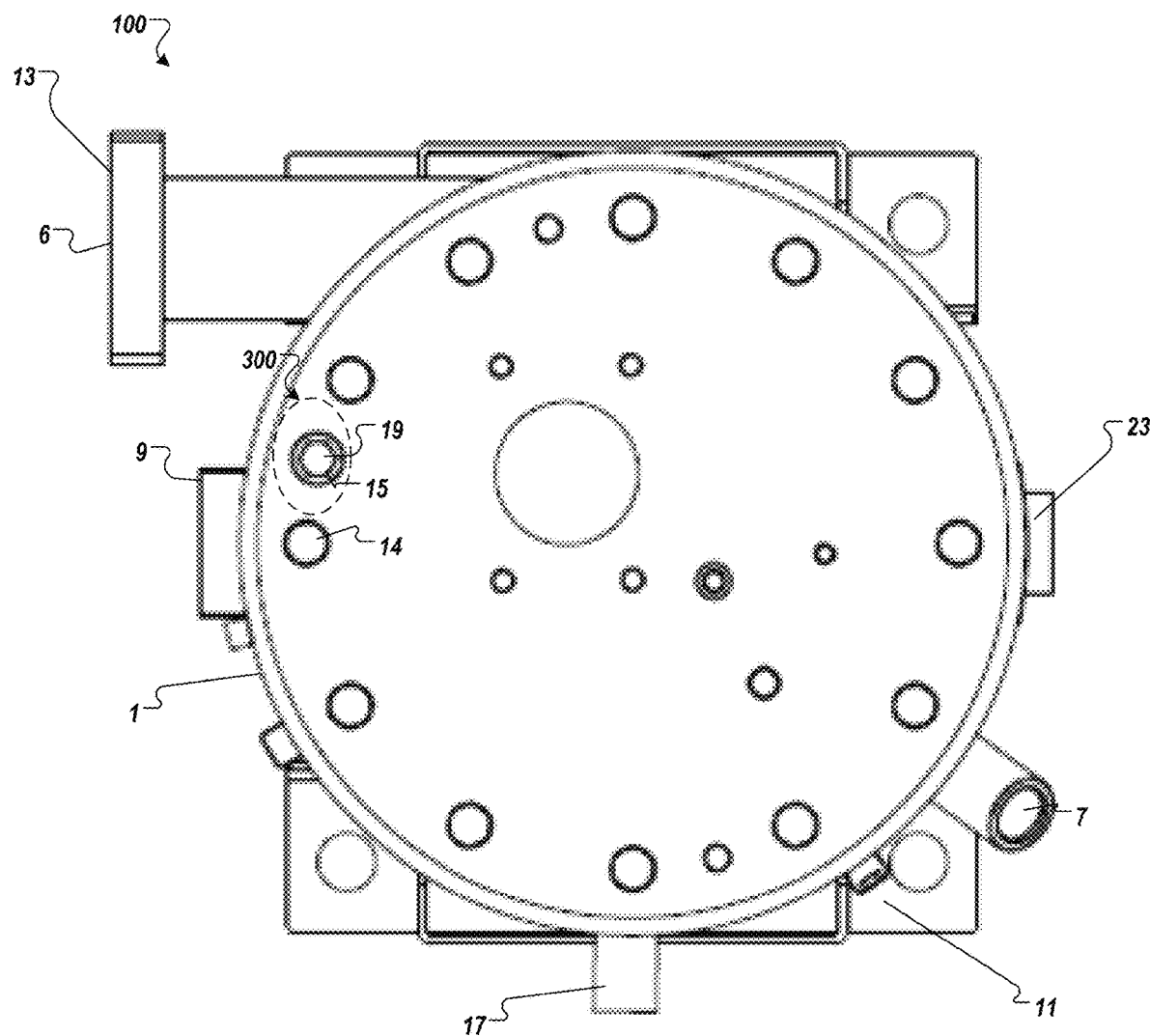
FIG. 9 is a top view of the separator tank taken along plane IX-IX' of FIG. 8.
Figure 10:
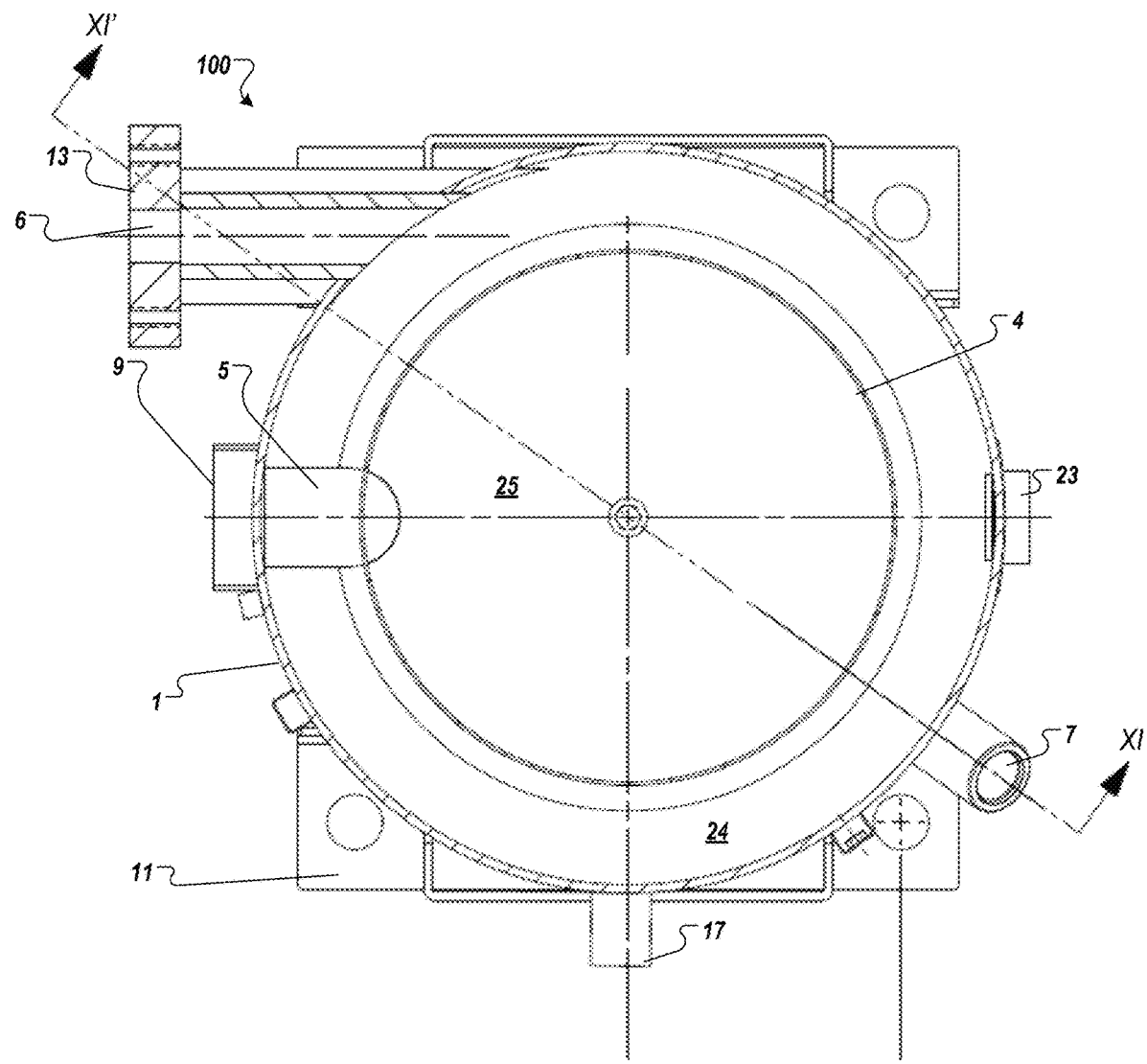
FIG. 10 is a sectional view of the separator tank taken along plane X-X' of FIG. 8.
Figure 11:
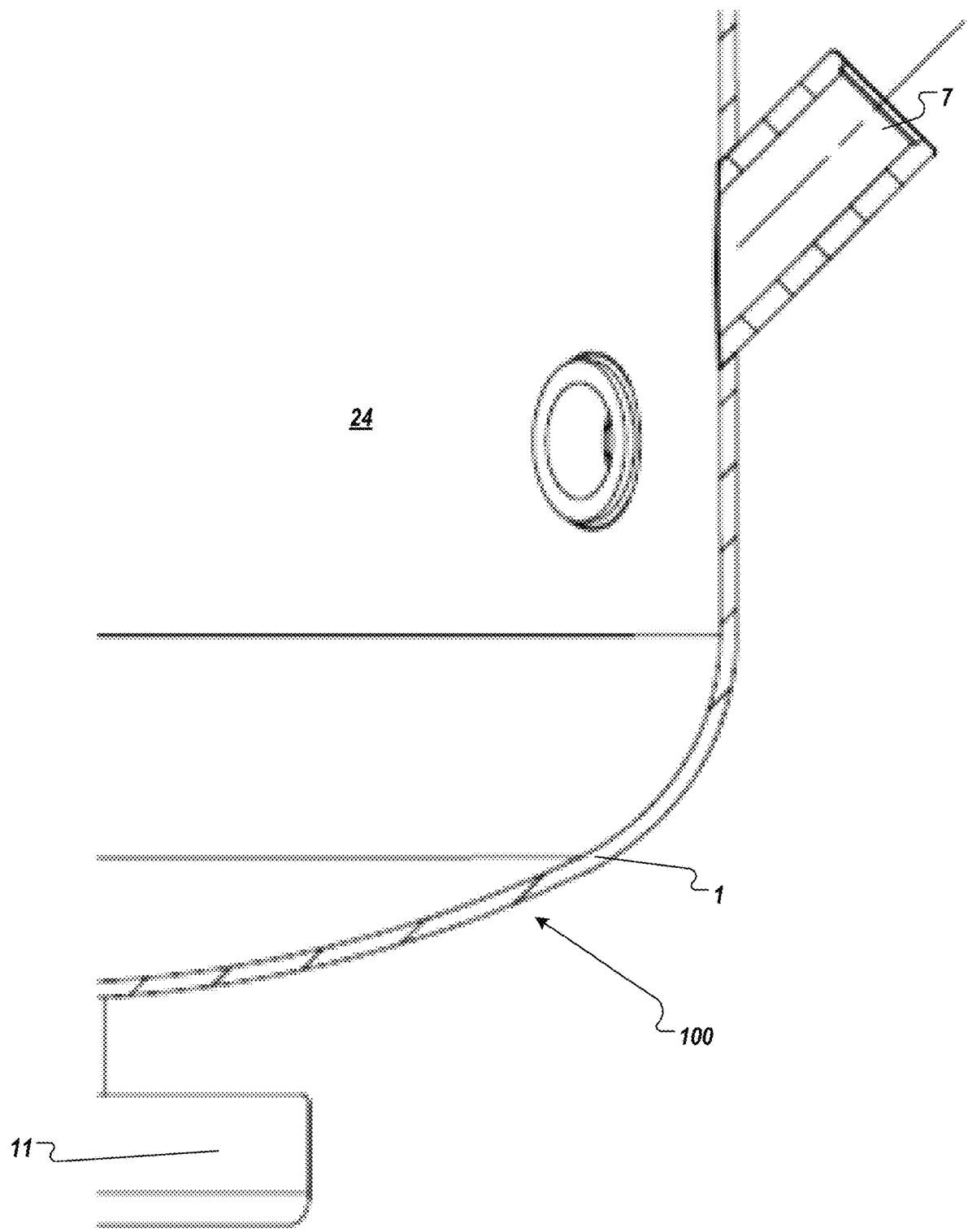
FIG. 11 is a sectional view of the separator tank taken along plane XI-XI' of FIG. 10.
Figure 12:
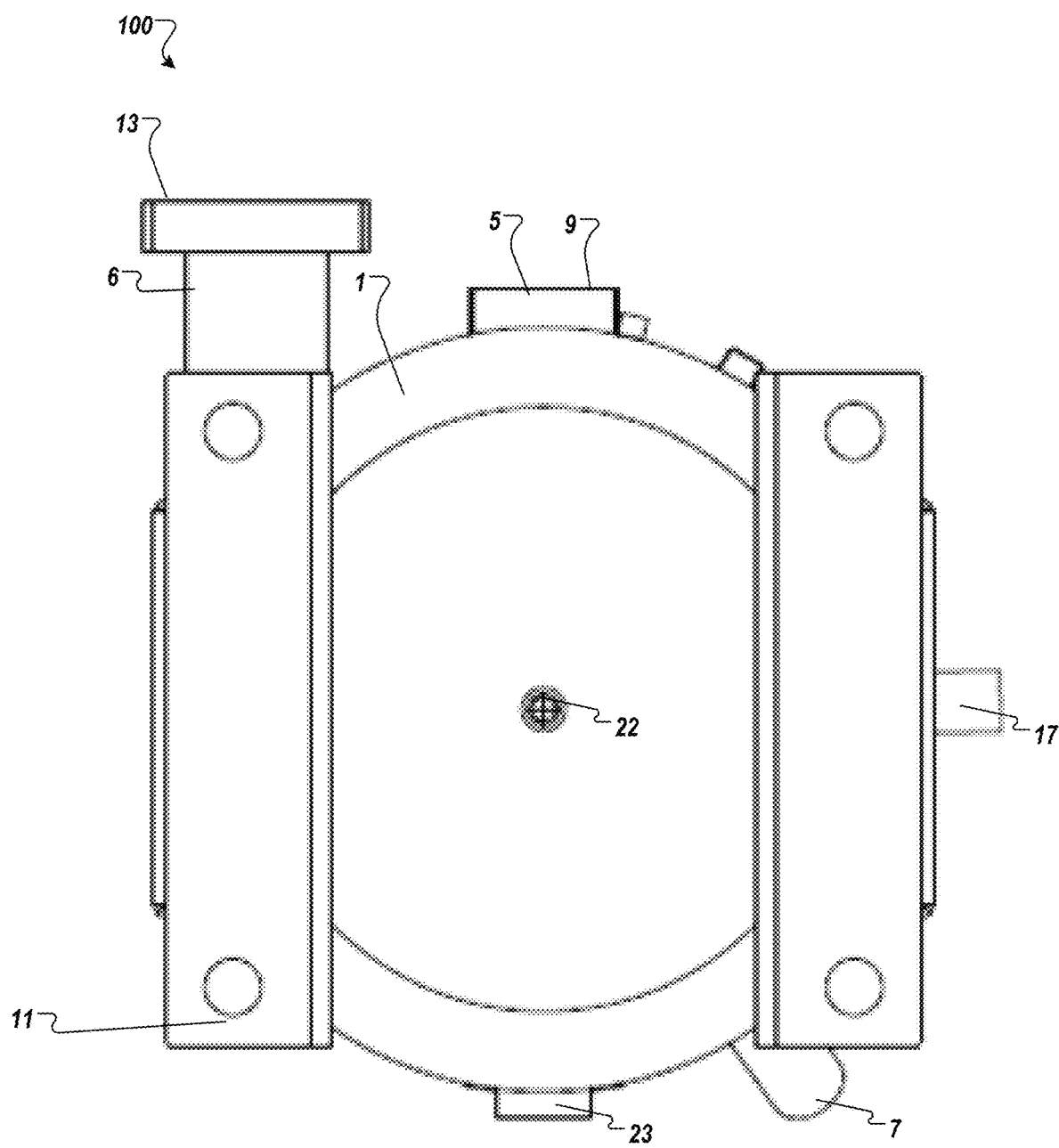
FIG. 12 is a bottom view illustrating the separator tank in accordance with the example implementation of FIG. 1.

FIGS. 1-12 illustrate various views of a separator tank 100 in accordance with example implementations of the present application. Specifically, FIGS. 1 and 2 are perspective views (exploded and unexploded views, respectively) generally illustrating a separator tank 100 in accordance with an example implementation of the present application. Further, FIGS. 3 and 5 are separate side views and FIGS. 6 and 8 are rear and front views of the separator tank 100. Additionally, FIGS. 9 and 12 are top and bottom views of the separator tank 100. Further, FIGS. 4, 7, 10 and 11 are different sectional views of the separator tank 100 taken along planes IV-IV', VII-VII', X-X' and XI-XI', respectively.

As illustrated, the separator tank 100 includes a tank body 1 enclosing an inner volume 24 and a sealing plate 2 attached to the top of the tank body 1 to seal the inner volume 24. The sealing plate 2 is secured to the tank body 1 by a plurality of retaining bolts 14. Each retaining bolt is threaded through a washer, inserted into the sealing plate 2 and engaging a flange, for example bolt flange 3 located at an upper end of the tank body.

The retaining bolts 14 may be threaded bolts, riveted bolts, or any other retaining bolt structure that might be apparent to a person of ordinary skill in the art. Further the retaining bolts may have a hexagonal head, octagonal head, pentagonal head, triangular head, star head, or any other head that might be apparent to a person of ordinary skill in the art. Additionally, the retaining bolt 14 may also be a screw having a Philips head, flat head, Allen head, star head, or any other head that might be apparent to a person of ordinary skill in the art. Further, the retaining bolt may also have no head and instead may receive a nut to secure the sealing plate 2 to the tank body 1 or any other retaining structure that might be apparent to a person of ordinary skill in the art.

The tank body 1 may be provided with a plurality of inlet and outlet ports or pipes. For example, a tank inlet pipe 6 may pass through the tank body 1 to allow fluid communication between the inner volume 24 of the tank body 1 and a compressed fluid system (not shown). The tank inlet pipe 6 may include a bracket 13 to allow connection to the tank inlet pipe 6 by a compressed air system.

Additionally, an oil fill tube 7 may also pass through the tank body 1 to allow oil to be inserted or removed from the inner volume 24 of the tank body. The tank body 1 may also include a thermostatic balancing valve 9 that controls flow through an oil suction tube 5 located within the inner volume 24. The tank body 1 may be connected to the compressed fluid system through the thermostatic balancing valve 9 to control oil flow into the compressed fluid system.

The tank body 1 may also include one or more pipe couplings (e.g., pipe coupling 17, pipe coupling 18, pipe coupling 22, and pipe coupling 23). These pipe couplings 17, 18, 22, and 23 may allow for the injection or removal of air, oil, or any other working fluid that may be involved in the operation or usage of the separator tank 100. For example, coupling 22 may be used to drain oil from the inner volume 24 of the tank body 1. Further, coupling 23 may use an overflow coupling to keep the oil level from rising too high and contacting a filter or separator element 4 located in the inner volume 24 of the tank body 1.

The exterior of the tank body 1 may also include one or more mounting clips 10, 12 to allow external equipment, tools, signage 8, or measurement devices to be mounted on the separator tank 100 without piercing the tank body 1.

The tank body 1 may sit on a tank support structure 11. For example, the tank support structure 11 may be metal legs or struts located underneath the tank. The tank support structure 11 may provide clearance underneath the separator tank 100. Additionally, the tank support structure 11 may also provide a structure to secure a separator tank 100 to a facility floor. For example, bolts, screws, rivets or other anchoring mechanism may be driven through the tank support structure 11 and into a facility floor to prevent tipping or rocking of the tank body.

As mentioned above, the separator tank 100 may be used to separate lubricating fluid (e.g., oil) from a compression fluid (e.g., air) in a compressor installation. This may be done using a filter or separator element 4 located within the inner volume 24 of the tank body 1. For example, mixed fluid (e.g., oil and air) may enter into the separator tank 100 through the tank inlet pipe 6 and the separator element 4 to stop oil and cause the oil to pool at the bottom of the pipe, while allowing air to pass through the separator element 4 and enter the inner volume 25 of the separator element 4.

Over time the separator element 4 may become clogged or fouled such that cleaning, repair, or replacement of the separator element 4 may be required. In order to access the inner volume of the tank body 1, the sealing plate 2 must be removed from the tank body 1. This may be done by first removing all of the retaining bolts 14 from the sealing plate 2. Once the retaining bolts 14 are removed, the sealing plate 2 can be lifted off of the tank body 1.

However, the sealing plate 2 may be too heavy to be manually lifted off of the tank body by a human, or a strong seal may be created during operation of the separator tank. Therefore, example implementations of the present application provide a lifting mechanism 300 to assist with lifting the sealing plate 2 off of the tank body 1. The lifting mechanism may include a pin 16 that is inserted into a flange, for example the bolt flange 3 of the tank body 1. The pin 16 may also be inserted through the sealing plate 2 and into a flange, for example base flange 15 extending upward from the top of the sealing plate 2.

The lifting mechanism 300 may also include a threaded device 19 that is coupled with the base flange 15 and positioned to be partially or fully inserted into the base flange 15. The pin 16 and the threaded device 19 may be positioned and sized such that as the threaded device is increasingly inserted into the base flange 15, the threaded device 19 contacts and pushes against the pin 16. The operation of the lifting mechanism is discussed below in greater detail with respect to FIGS. 13 and 14.

Figure 13A:
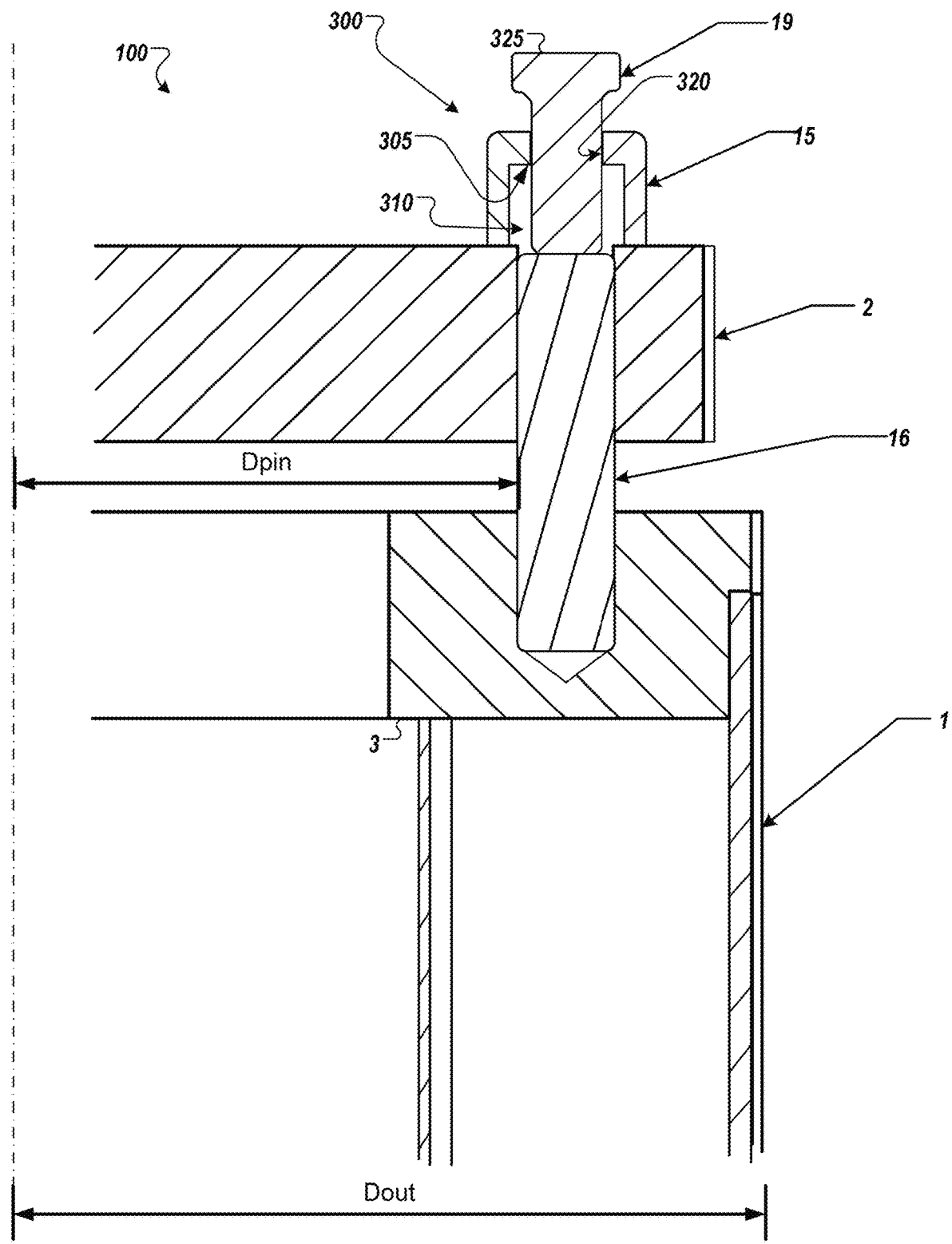
FIGS. 13A and 13B are enlarged cross-section views of the lifting mechanism in accordance with example implementations of the present application.
Figure 13B:
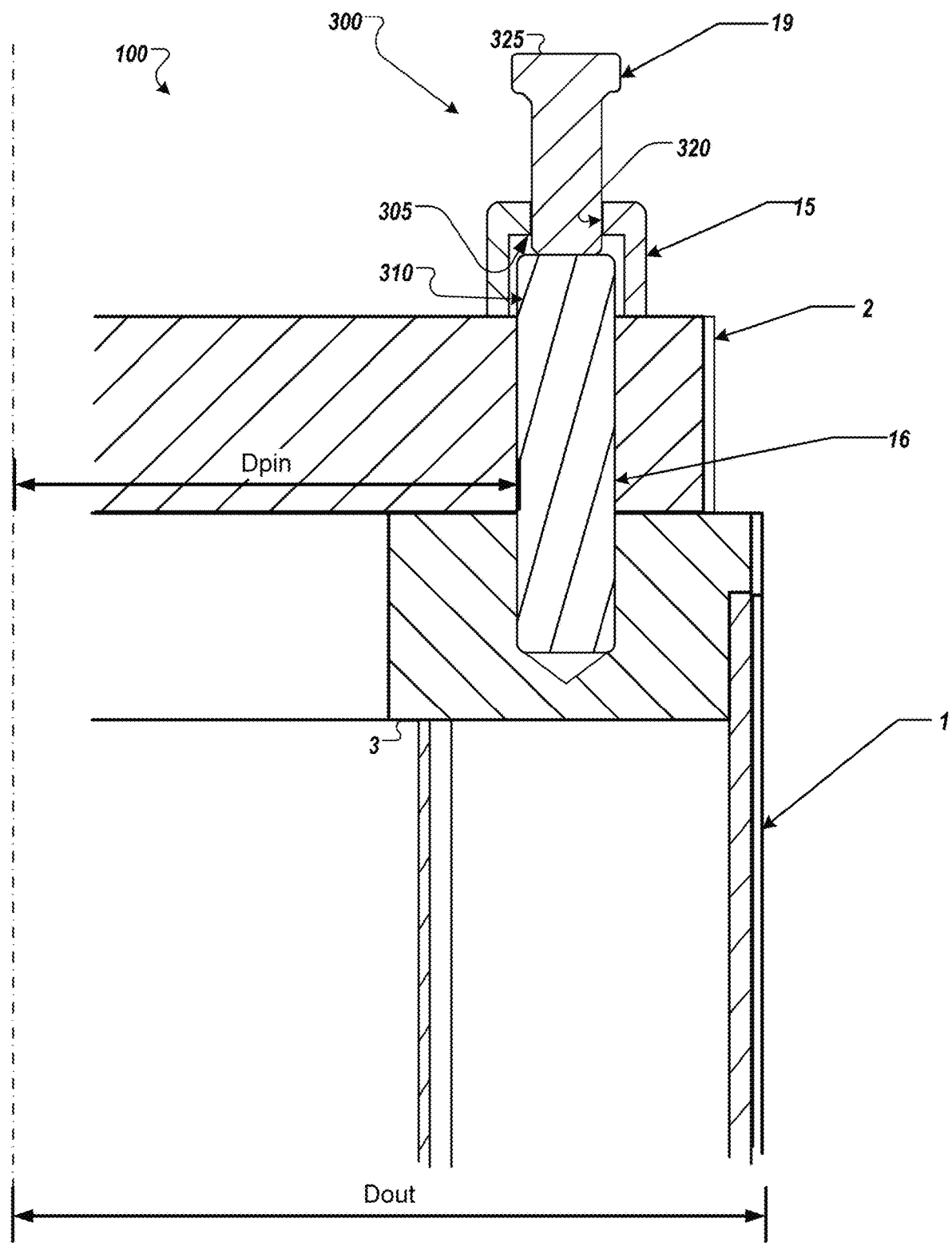

FIGS. 13A and 13B are enlarged cross-section views of the lifting mechanism 300 in accordance with an example implementation of the present application. FIG. 13A illustrates the sealing plate 2 in a lifted position and FIG. 13B illustrates the sealing plate 2 in a lowered, sealing position. The lifting mechanism 300 includes a pin 16, base flange 15 and a threaded device 19. The pin 16 is inserted into a flange, for example bolt flange 33 of the tank body 1. In some example implementations, the pin 16 may be secured to a flange, for example the bolt flange 3 by adhesive, press fitting, screw fitting (either clockwise or counter-clockwise), welding, or any other securing mechanism that may be apparent to a person of ordinary skill in the art. Additionally, the pin 16 may extend upward from the bolt flange 3 of the tank body 1 through the sealing plate 2 and into the interior 310 of the base flange 15. Further, in some example implementations, the pin 16 may have a cylindrical shape. Additionally, the pin 16 may have a length such that the pin 16 may extend through the entire thickness or height of the sealing plate 2 and extend at least partially into the base flange 15 of the sealing plate 2 as illustrated in FIGS. 13A and 13B. Further, the pin 16 may also have a length shorter than the height of the base flange 15 such that the base flange 15 does not contact the pin 16 when the sealing plate 2 is in a lowered position installed on the tank body 1 and the pin 16 is fully inserted into the base flange 15 as illustrated in FIG. 13B.

The base flange 15 may be a structure that extends upward from the top of the sealing plate 2 to receive the pin 16 when the sealing plate 2 is installed on top of the tank body 1. The base flange 15 and pin 16 may be sized such that the sealing plate 2 can contact the bolt flange 3 without the pin 16 contacting the upper surface 305 of the interior 310 of the base flange 15. In some example implementations, the base flange 15 may have a cylindrical structure with a circular cross-section. However, example implementations are not limited to this configuration and the base-flange may have a rectangular cross-section, or any other structure that might be apparent to a person of ordinary skill in the art.

The threaded device 19 may be coupled to the sealing plate 2 by the base flange 15 and positioned to be partially or fully inserted into the base flange 15. The threaded device 19 may have a tool head 325 shaped and sized to engage a tool or torque device. For example, the tool head 325 may be shaped as a hexagonal head, octagonal head, pentagonal head, triangular head, star head, or any other head that might be apparent to a person of ordinary skill in the art. Additionally, the tool head 325 may be a screw head such as having a Philips head, flat head, Allen head, star head, or any other head that might be apparent to a person of ordinary skill in the art.

Further, the threaded device 19 may engage a surface 320 of base flange 15 to be held in the base flange 15. In some example implementations, the surface 320 of the base flange 15 may be a threaded surface 320 such that rotation of the threaded device 19 is translated into vertical movement of the threaded device 325.

When the threaded device 19 is inserted into the base flange 15, the threaded device 19 may be vertically aligned with the pin 16. Further, the pin 16 and the threaded device 19 may be sized such that the threaded device selectively engages or contacts the pin 16 as the threaded device 19 is inserted into or removed from a portion of the sealing plate 2, for example the base flange 15. In other words, as the threaded device 19 is first inserted into a portion of the sealing plate 2, for example inserted into the base flange 15 of the sealing plate 2, the threaded device 19 approaches and then contacts the pin 16. As the threaded device 19 contacts the pin 16, the threaded device 19 applies a pushing force to push the pin 16 away from the base flange 15 and the sealing plate 2. However, the pin 16 being inserted into the bolt flange 3 of the tank body 1, the pin 16 does not move, effectively applying a lifting force back toward the sealing plate 2 to lift the sealing plate 2 off of the tank body 1 as illustrated in FIG. 13A.

Further, as the threaded device 19 may engage a threaded surface 320 of the base flange 15, rotation of the threaded device 19 may cause the threaded device 19 to move either vertically upward or vertically downward depending on the direction of rotation. For example, in some example implementations clockwise rotation of the threaded device 19 may cause the threaded device 19 to move vertically upward and become less inserted into a portion of the sealing plate 2 (e.g., the base flange 15 of the sealing plate). Conversely, counter-clockwise rotation of the threaded device 19 may cause the threaded device 19 to move vertically downward and become more inserted into a portion of the sealing plate 2 in such example implementations.

As may be apparent to a person of ordinary skill in the art, the threads on the threaded surface 320 may alternatively be reversed such that clockwise rotation of the threaded device 19 may be translated into vertically downward movement, and counter-clockwise rotation may be translated into vertically upward movement.

Thus, vertical movement of the threaded device 19 may be selectively controlled by controlling rotation of the threaded device. Further, as the threaded device 19 is moved vertically, the threaded device 19 may be selectively inserted into or removed from a portion of the sealing plate, for example the base flange 15. In other words, as the threaded device 19 is moved vertically downward, the threaded device 19 may be increasingly inserted into the sealing plate 2 or the base flange 15 of the sealing plate as illustrated in FIGS. 13A and 13B.

Further, as explained above, as the threaded device 19 is increasingly inserted into the sealing plate 2 or the base flange 15 of the sealing plate 2, the threaded device 19 may contact the pin 16 and apply a pushing force to the pin 16. As the threaded device 19 pushes against the pin 16, the sealing plate 2 may be lifted or separated from the tank body 1 as illustrated in FIG. 13A.

Additionally, once the sealing plate 2 has been separated from the tank body 1, the sealing plate 2 may be rotated (clockwise or counter-clockwise) about the pin 16 as pivot point to allow the sealing plate 2 to moved out of the way so that the interior of the tank 100 can be accessed. In some example implementations, the sealing plate 2 may have a full 360-degree range of motion about the pin 16.

Thus, the pin 16 may function not only as a component of the lifting mechanism 300 but may also support the sealing plate 2 when the sealing plate 2 is in an open position. Further, the pin 16 may also provide lateral (e.g., in a horizontal direction) retention or location of the sealing plate 2 relative to the tank body 1. In other words, the pin 16 may assist with horizontal alignment of the sealing plate 2 with the tank body 1.

Further, as illustrated in FIGS. 13A and 13B, the pin 16, threaded device 19, and base flange 15 may be located at a diameter ($D_{pin}$) from a centerline C of the tank body 1 located within the outer diameter ($D_{out}$) from the centerline C of the tank body 1 in some example implementations. This may allow the lifting mechanism 300 to be located within the external circumference of the tank body 1 such that the footprint of the separator tank 100 is not increased by the lifting mechanism. Thus, the space required for the separator tank 100 may be reduced as compared to related art separator tanks that have an exterior lifting mechanism, which can allow tighter packing of separator tanks and/or cost reductions in compressor installations.

Figure 14A:
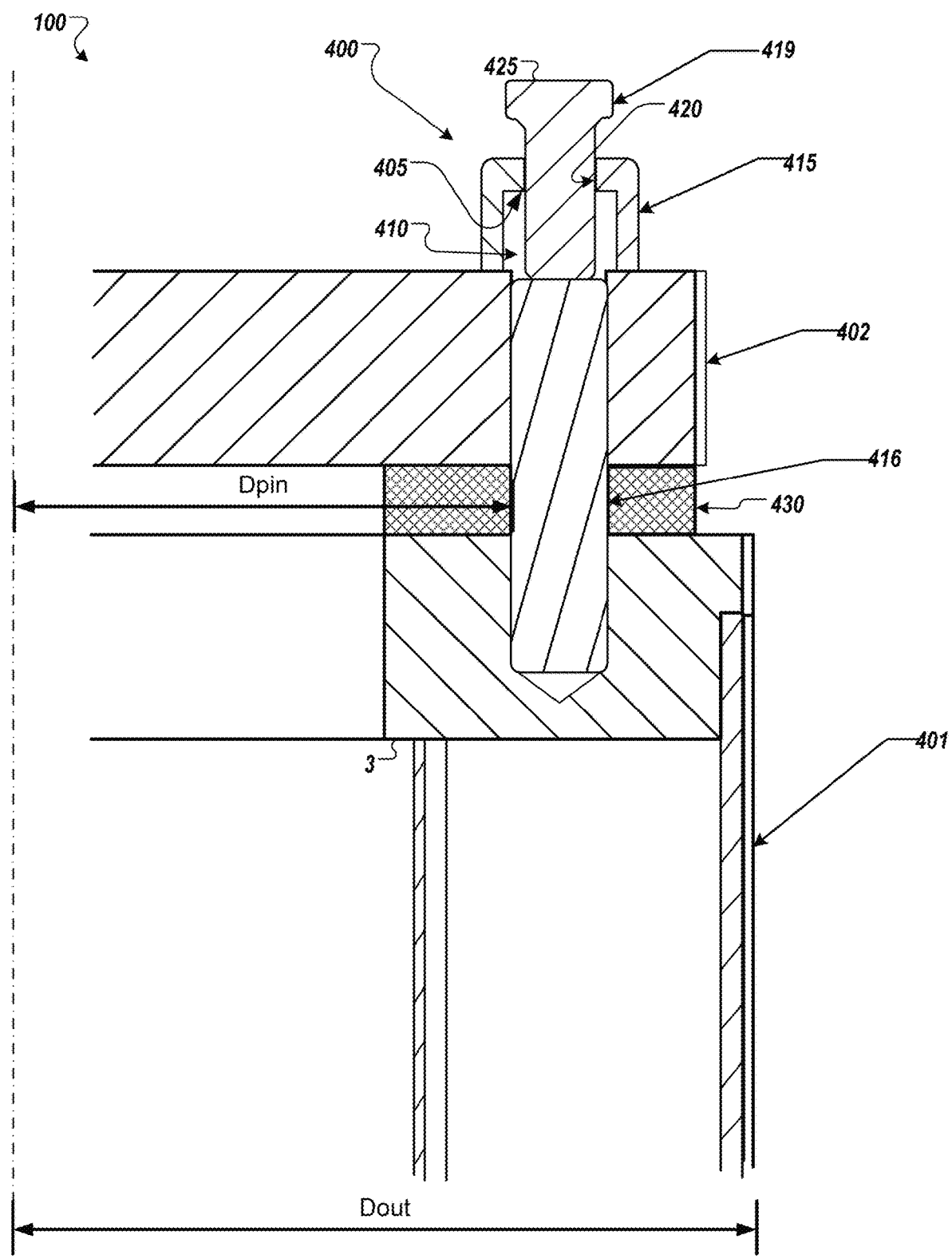
FIGS. 14A and 14B are enlarged cross-section views of the lifting mechanism in accordance with another example implementation of the present application.
Figure 14B:
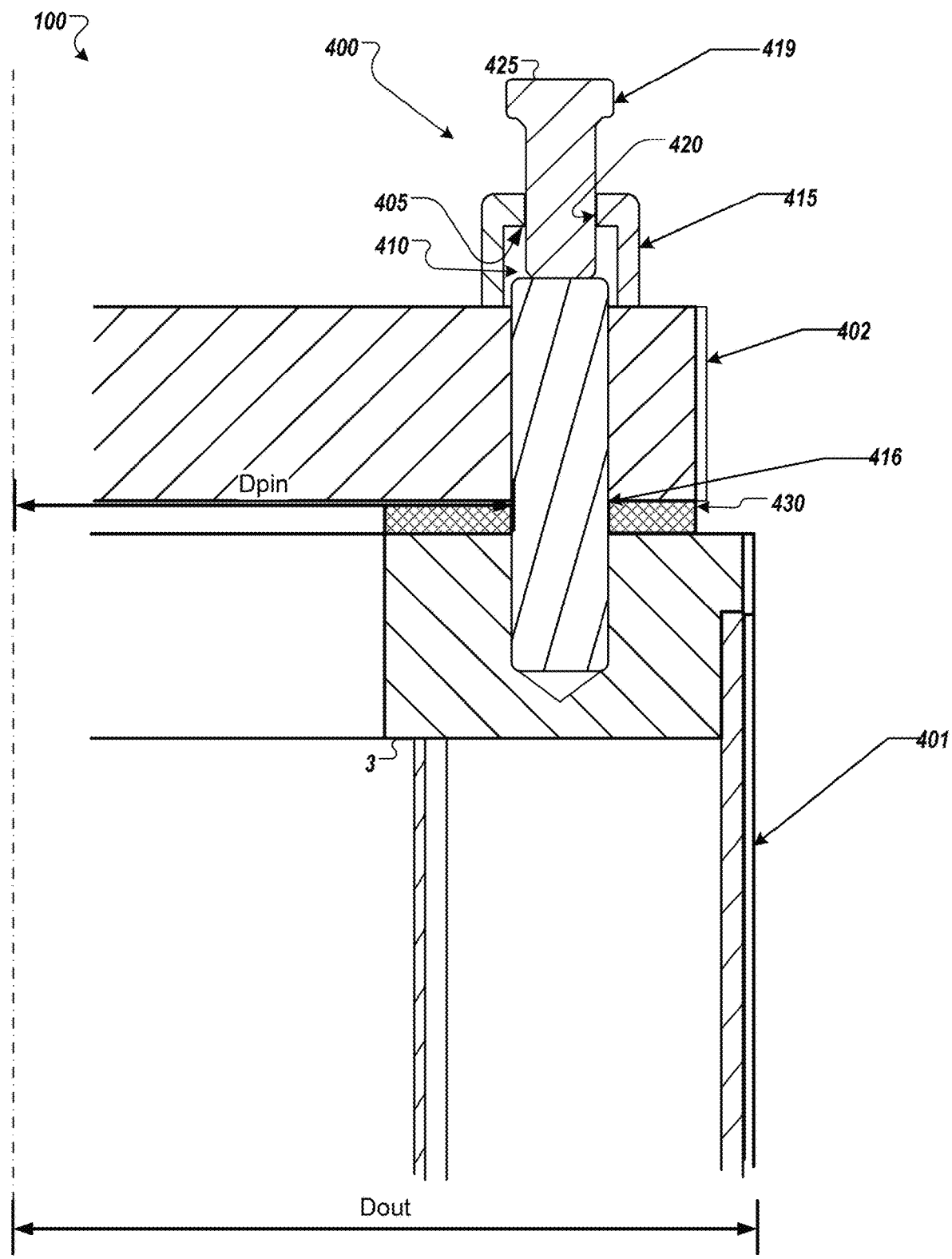

FIGS. 14A and 14B are enlarged cross-section views of the lifting mechanism 400 in accordance with another example implementation of the present application. FIG. 14A illustrates the sealing plate in a lifted position and FIG. 14B illustrates the sealing plate in a lowered, sealing position. The lifting mechanism 400 includes features similar to the lifting mechanism 300 discussed above. For example, the lifting mechanism 400 includes a pin 416, base flange 415 and a threaded device 419. The pin 416 is inserted into a flange, for example bolt flange 3 of the tank body 1. In some example implementations, the pin 416 may be secured to a flange, for example the bolt flange 3 by adhesive, press fitting, screw fitting (either clockwise or counter-clockwise), welding, or any other securing mechanism that may be apparent to a person of ordinary skill the art. Additionally, the pin 416 may extend upward from the bolt flange 3 of the tank body 1 through the sealing plate 2 and into the interior 410 of a flange, for example the base flange 415. Further, in some example implementations, the pin 416 may have a cylindrical shape. Additionally, the pin 416 may have a length such that the pin 416 may extend through the entire thickness or height of the sealing plate 402 and extend at least partially into the base flange 415 of the sealing plate 402 as illustrated in FIGS. 14A and 14B. Further, the pin 416 may also have a length shorter than the height of the base flange 415 such that the base flange 415 does not contact the pin 416 when the sealing plate 402 is in a lowered position installed on the tank body 401 and the pin 416 is fully inserted into the base flange 415 as illustrated in FIG. 14B.

Further, a compression gasket 430 may be positioned between the sealing plate 2 and the tank body 1. The pin 416 may also extend through the compression gasket 430 such that the compression gasket 430 seals around the pin 416.

The base flange 415 may be a structure that extends upward from the top of the sealing plate 2 to receive the pin 416 when the sealing plate 2 is installed on top of the tank body 1. The base flange 415 and pin 416 may be sized such that the sealing plate 2 can contact the bolt flange 3 without the pin 416 contacting the upper surface 405 of the interior 410 of the base flange 415. In some example implementations, the base flange 415 may have a cylindrical structure with a circular cross-section. However, example implementations are not limited to this configuration and the base-flange may have a rectangular cross-section, or any other structure that might be apparent to a person of ordinary skill in the art.

The threaded device 419 may be coupled to the sealing plate 2 by the base flange 415 and positioned to be partially or fully inserted into the base flange 415. The threaded device 419 may have a tool head 425 shaped and sized to engage a tool or torque device. For example, the tool head 425 may be shaped as a hexagonal head, octagonal head, pentagonal head, triangular head, star head, or any other head that might be apparent to a person of ordinary skill in the art. Additionally, the tool head 425 may be a screw head such as having a Philips head, flat head, Allen head, star head, or any other head that might be apparent to a person of ordinary skill in the art.

Further, the threaded device 419 may engage a surface 420 of base flange 415 to be held in the base flange 415. In some example implementations, the surface 420 of the base flange 415 may be a threaded surface 420 such that rotation of the threaded device 419 is translated into vertical movement of the threaded device 425.

When the threaded device 419 is inserted into the base flange 415, the threaded device 419 may be vertically aligned with the pin 416. Further, the pin 416 and the threaded device 419 may be sized such that the threaded device selectively engages or contacts the pin 416 as the threaded device 419 is inserted into or removed from a portion of the sealing plate 402, for example base flange 415. In other words, as the threaded device 419 is first inserted into a portion of the sealing plate 402, for example inserted into the base flange 415 of the sealing plate 402, the threaded device 419 approaches and then contacts the pin 416. As the threaded device 419 contacts the pin 416, the threaded device 419 applies a pushing force to push the pin 416 away from the base flange 415 and the sealing plate 402. However, the pin 416 being inserted into the bolt flange 3 of the tank body 401, the pin 416 does not move, effectively applying a lifting force back toward the sealing plate 402 to lift the sealing plate 402 off of the tank body 401 as illustrated in FIG. 14A.

Further, as the threaded device 419 may engage a threaded surface 420 of the base flange 415, rotation of the threaded device 419 may cause the threaded device 419 to move either vertically upward or vertically downward depending on the direction of rotation. For example, in some example implementations clockwise rotation of the threaded device 419 may cause the threaded device 419 to move vertically upward and become less inserted into a portion of the sealing plate 402 (e.g., the base flange 415 of the sealing plate). Conversely, counter-clockwise rotation of the threaded device 419 may cause the threaded device 419 to move vertically downward and become more inserted into a portion of the sealing plate 402 in such example implementations.

As may be apparent to a person of ordinary skill in the art, the threads on the threaded surface 420 may alternatively be reversed such that clockwise rotation of the threaded device 419 may be translated into vertically downward movement, and counter-clockwise rotation may be translated into vertically upward movement.

Thus, vertical movement of the threaded device 419 may be selectively controlled by controlling rotation of the threaded device. Further, as the threaded device 419 is moved vertically, the threaded device 419 may be selectively inserted into or removed from a portion of the sealing plate, for example the base flange 415. In other words, as the threaded device 419 is moved vertically downward, the threaded device 419 may be increasingly inserted into the sealing plate 402 or the base flange 415 of the sealing plate as illustrated in FIGS. 14A and 14B.

Further, as explained above, as the threaded device 419 is increasingly inserted into the sealing plate 402 or the base flange 415 of the sealing plate 402, the threaded device 419 may contact the pin 416 and apply a pushing force to the pin 416. As the threaded device 419 pushes (e.g., applies a pushing force) against the pin 416, the sealing plate 402 may be lifted or separated from the tank body 401 as illustrated in FIG. 14A. Additionally, as the sealing plate 402 is lifted or separated from the tank body 401, the compression gasket 430 may expand to assist with separation of the sealing plate 402 from the tank body 401.

Additionally, once the sealing plate 402 has been separated from the tank body 401, the sealing plate 402 may be rotated (clockwise or counter-clockwise) about the pin 416 as pivot point to allow the sealing plate 402 to be moved out of the way so that the interior of the tank 100 can be accessed. In some example implementations, the sealing plate 402 may have a full 360-degree range of motion about the pin 416. Further, the compression gasket 430 may adhere to the tank body 401 and remain stationary when the sealing plate 402 is rotated in some example implementations. Alternatively, the compression gasket 430 may adhere to the sealing plate 402 and rotate with the sealing plate 402 in other example implementations.

Thus, the pin 416 may function not only as a component of the lifting mechanism 400 but may also support the sealing plate 402 when the sealing plate 402 is in an open position. Further, the pin 416 may also provide lateral (e.g., in a horizontal direction) retention or location of the sealing plate 402 relative to the tank body 401. In other words, the pin 416 may assist with horizontal alignment of the sealing plate 402 with the tank body 401.

Further, as illustrated in FIGS. 14A and 14B, the pin 416, threaded device 419, and base flange 415 may be located at a diameter ($D_{pin}$) from a centerline C of the tank body 401 located within the outer diameter ($D_{out}$) from the centerline C of the tank body 401 in some example implementations. This may allow the lifting mechanism 400 to be located within the external circumference of the tank body 401 such that the footprint of the separator tank 100 is not increased by the lifting mechanism. Thus, the space required for the separator tank 100 may be reduced as compared to related art separator tanks that have an exterior lifting mechanism, which can allow tighter packing of separator tanks and/or cost reductions in compressor installations.

The foregoing detailed description has set forth various example implementations of the devices and/or processes via the use of diagrams, schematics, and examples. Insofar as such diagrams, schematics, and examples contain one or more functions and/or operations, each function and/or operation within such diagrams, or examples can be implemented, individually and/or collectively, by a wide range of structures. While certain example implementations have been described, these implementations have been presented by way of example only, and are not intended to limit the scope of the protection. Indeed, the novel methods and apparatuses described herein may be embodied in a variety of other forms. Furthermore, various omissions, substitutions and changes in the form of the devices and systems described herein may be made without departing from the spirit of the protection. The accompanying claims and their equivalents are intended to cover such forms or modifications as would fall within the scope and spirit of the protection.

What is claimed:

1. A lifting mechanism for separating a sealing plate from a tank body of a tank, the lifting mechanism comprising:
   a pin inserted into a flange of the tank body extending through the sealing plate;
   a threaded device coupled to the sealing plate and selectively contacting the pin to apply a pushing force in response to the threaded device being inserted into the sealing plate; and
   a base flange extending upward from the sealing plate, wherein the threaded device engages the base flange; and
   wherein the pin extends entirely through the sealing plate and at least partially into the base flange.

2. The lifting mechanism of claim 1, wherein the base flange includes a threaded surface that engages the threaded device to translate rotation of the threaded device into vertical movement of the threaded device; and
   wherein the vertical movement of the threaded device selectively increases and decreases insertion of the threaded device into the base flange.

3. The lifting mechanism of claim 2, wherein the threaded device includes a tool head configured to engage a tool to facilitate rotation of the threaded device.

4. The lifting mechanism of claim 2, wherein the pin has a length shorter than a height of the base flange and does not contact the base flange when inserted into the base flange.

5. The lifting mechanism of claim 2, wherein the pin is positioned at a diameter from a centerline of the tank body that is less than an outer diameter from the centerline of the tank body.

6. The lifting mechanism of claim 2, wherein the pin has a cylindrical shape and provides a pivot point for the sealing plate to rotate relative to the pin.

7. A tank comprising:
   a tank body comprising a bolt flange;
   a sealing plate coupled to the tank body to selectively seal the tank body adjacent the bolt flange;
   a pin inserted into the bolt flange of the tank body and extending through the sealing plate;

a threaded device coupled to the sealing plate and selectively contacting the pin to apply a pushing force in response to the threaded device being inserted into the sealing plate;

wherein the sealing plate further comprises a base flange extending upward from the sealing plate;

wherein the threaded device engages the base flange; and wherein the pin extends entirely through the sealing plate and at least partially into the base flange.

8. The tank of claim 7, wherein the base flange includes a threaded surface that engages the threaded device to translate rotation of the threaded device into vertical movement of the threaded device; and wherein the vertical movement of the threaded device selectively increases and decreases insertion of the threaded device into the base flange.

9. The tank of claim 8, wherein the threaded device includes a tool head configured to engage a tool to facilitate rotation of the threaded device.

10. The tank of claim 8, wherein the pin has a length shorter than a height of the base flange and does not contact the base flange when inserted into the base flange.

11. The tank of claim 8, wherein the pin is positioned at a diameter from a centerline of the tank body that is less than an outer diameter from the centerline of the tank body.

12. The tank of claim 8, wherein the pin has a cylindrical shape and provides a pivot point for the sealing plate to rotate relative to the pin.

* * * * *